(12) United States Patent
Chuang

(10) Patent No.: US 7,385,807 B1
(45) Date of Patent: Jun. 10, 2008

(54) HEIGHT-ADJUSTABLE DOCKING STATION

(75) Inventor: Cheng-Hsiang Chuang, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 11/675,454

(22) Filed: Feb. 15, 2007

(30) Foreign Application Priority Data

Dec. 7, 2006 (TW) .............. 95145603 A

(51) Int. Cl.
*H05K 5/00* (2006.01)
*H05K 7/00* (2006.01)
*G06F 1/16* (2006.01)
*A47B 81/00* (2006.01)

(52) U.S. Cl. .............. 361/679; 361/683; 312/223.3

(58) Field of Classification Search .............. 361/679, 361/683, 686; 248/917, 918; 312/223.2, 312/223.3
See application file for complete search history.

(56) References Cited

U.S. PATENT DOCUMENTS

| | | | |
|---|---|---|---|
| 6,061,233 A * | 5/2000 | Jung | 361/686 |
| 6,152,414 A * | 11/2000 | Jondrow | 248/346.03 |
| 6,233,144 B1 * | 5/2001 | Lee et al. | 361/686 |
| 6,256,193 B1 * | 7/2001 | Janik et al. | 361/683 |
| 6,556,435 B1 * | 4/2003 | Helot et al. | 361/686 |
| 6,583,985 B2 * | 6/2003 | Nguyen et al. | 361/686 |
| 6,934,151 B2 * | 8/2005 | Nakano et al. | 361/686 |
| 7,035,100 B2 * | 4/2006 | Lord | 361/686 |
| 2002/0159231 A1 * | 10/2002 | Nguyen et al. | 361/686 |
| 2006/0250764 A1 * | 11/2006 | Howarth et al. | 361/683 |

* cited by examiner

*Primary Examiner*—Jayprakash N Gandhi
*Assistant Examiner*—Anthony M Haughton
(74) *Attorney, Agent, or Firm*—J.C. Patents

(57) ABSTRACT

A height-adjustable docking station including a main frame, a hook structure, and a lever is provided. The hook structure and the lever are pivoted on the main frame. The hook structure has a plurality of positioning grooves at different levels. One end of the lever has an adjusting rod, and the other end of the lever has a tenon for being wedged into one of the positioning grooves. When a user adjusts the adjusting rod, the tenon comes off the original positioning groove and is wedged into other positioning groove, thus changing the horizontal level of the docking station.

5 Claims, 4 Drawing Sheets

HEIGHT-ADJUSTABLE DOCKING STATION

CROSS-REFERENCE TO RELATED APPLICATION

This application claims the priority benefit of Taiwan application serial no. 95145603, filed Dec. 7, 2006. All disclosure of the Taiwan application is incorporated herein by reference.

BACKGROUND OF THE INVENTION

1. Field of the Invention

The present invention relates to a height-adjustable mechanism. More particularly, the present invention relates to a height-adjustable mechanism applicable to a docking station.

2. Description of Related Art

Different from a desktop computer, a portable computer is light, thin, short, and small, and can be carried by a user and used in various environments conveniently. However, in another aspect, limited by the light, thin, short, and small requirements, the function and expandability of the portable computer cannot catch up with those of the desktop computer having broad application space.

Accordingly, the conventional art provides a docking station with a connector. A user can connect peripheral devices including a mouse, a printer, an external hard disk, a Network Interface Card (NIC), or a scanner of a computer to the docking station constantly. When intending to use the peripheral devices, the user can electrically connect the portable computer with the peripheral devices only through connecting the portable computer with the docking station. In this manner, the user can enjoy the lightness of the portable computer, and also by the use of the docking station, the user will not be bothered by inserting and extracting the peripheral devices to and from the portable computer, such that the portable computer has the same function and expandability of the desktop computer.

However, when the portable computer is placed on the docking station, the tilt angle of the docking station of the conventional art cannot be adjusted according to different users' requirements. Therefore, the docking station of the conventional art really needs improvements.

SUMMARY OF THE INVENTION

The present invention provides a docking station, which is wedged into positioning groove at different positions in a hook structure through a tenon of a lever, so as to adjust the horizontal level of the docking station.

The height-adjustable docking station provided by the present invention includes a main frame, a hook structure, a first elastic member, a lever, and a second elastic member. The main frame has a recess. The hook structure has a first end and a second end connected to the first end. The first end of the hook structure is pivoted on the main frame, and the second end has a first positioning groove and at least one second positioning groove. The first positioning groove and the second positioning groove are disposed on different horizontal levels. Furthermore, an arc surface is formed between the first end and the second end, and contacts a carrying surface. The first elastic member is pivoted on the first end of the hook structure. One end of the first elastic member is fixed on the main frame, and another end is fixed on the hook structure, such that the second end of the hook structure is constantly far away from the main frame. The lever has a first rod, a second rod, and a pivot portion connected between the first rod and second rods. The first rod has an adjusting rod exposed by the recess, and the second rod has a tenon protruding outwards, so as to be wedged into the first positioning groove or the second positioning groove. The lever is pivoted on the main frame through the pivot portion. The second elastic member is pivoted on the pivot portion of the lever, in which one end of the lever is fixed on the main frame, and the other end is fixed on the lever, such that the second rod of the lever constantly rests against the second end of the hook structure. When the tenon is wedged into the first positioning groove, a first horizontal level is formed between the main frame and the carrying surface. When the adjusting rod is adjusted to make the tenon come off the first positioning groove, the second end of the hook structure comes off the main frame, such that the tenon is wedged into the second positioning groove, and at this time, a second horizontal level is formed between the main frame and the carrying surface. The second horizontal level is not equal to the horizontal level.

In an embodiment of the present invention, the height-adjustable docking station further includes a damper which is pivoted on the first end of the hook structure.

In an embodiment of the present invention, the main frame has an arc surface on which the hook structure is disposed.

In an embodiment of the present invention, a plurality of adjustment sections corresponding to different horizontal levels is marked beside the recess of the main frame.

In an embodiment of the present invention, the hook structure is an asymmetric arched structure.

The height-adjustable docking station provided by the present invention includes a main frame, a hook structure, and a lever. The hook structure and the lever are pivoted on the main frame. The hook structure has a plurality of positioning grooves at different levels. One end of the lever has a tenon for being wedged into one of the positioning grooves, such that the user can adjust the tenon to make it come off the original positioning groove and being wedged into another positioning groove, thereby achieving the purpose of changing the horizontal level of the docking station. As such, the user can adjust the level of the docking station relative to a desktop according to different requirements, thus changing a tilt angle formed between a notebook computer and the desktop, thereby enhancing the comfortability when using the notebook computer.

In order to the make aforementioned and other objects, features and advantages of the present invention comprehensible, a preferred embodiment accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
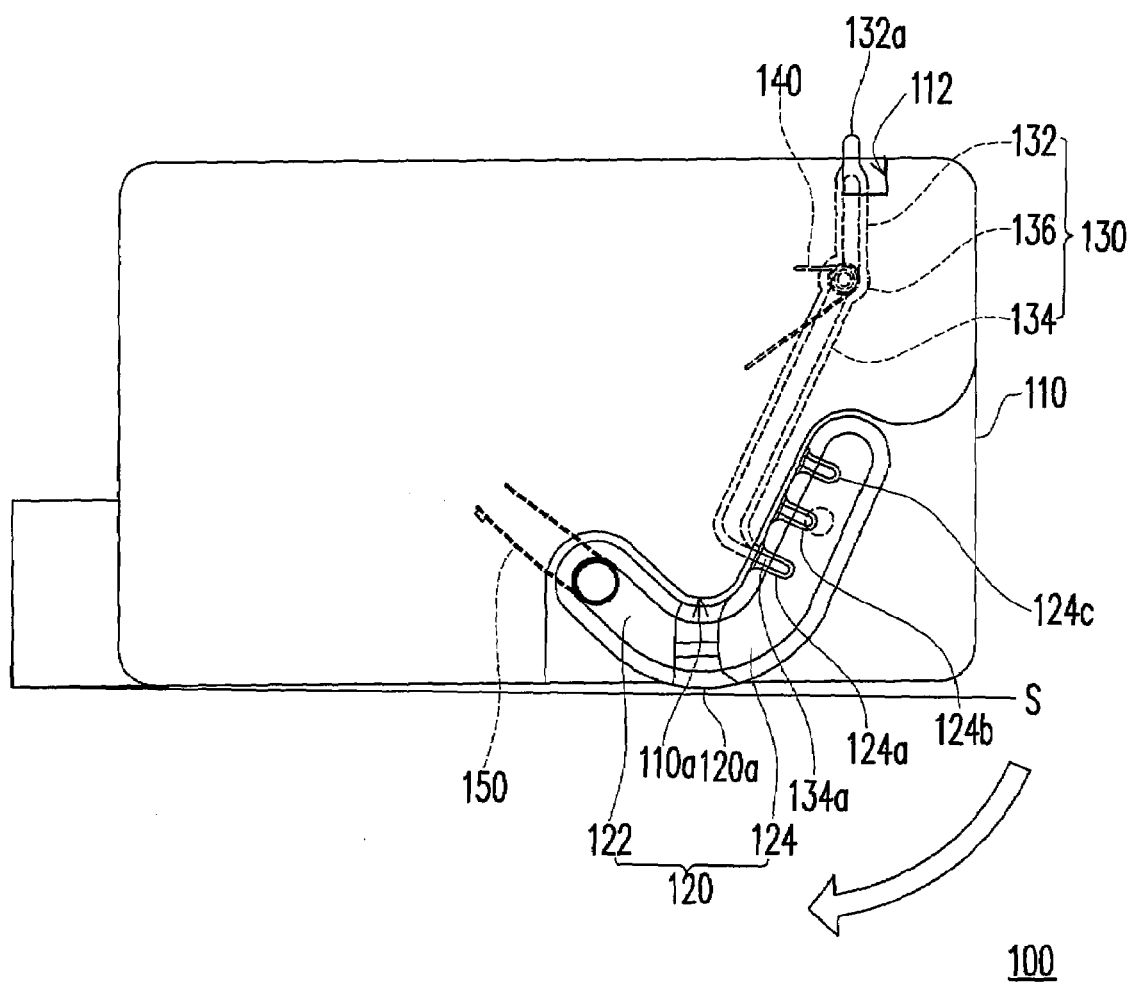
FIGS. 1 and 2 are a schematic cross-sectional diagram and a schematic appearance diagram of the height-adjustable docking station according to an embodiment of the present invention.
Figure 2:
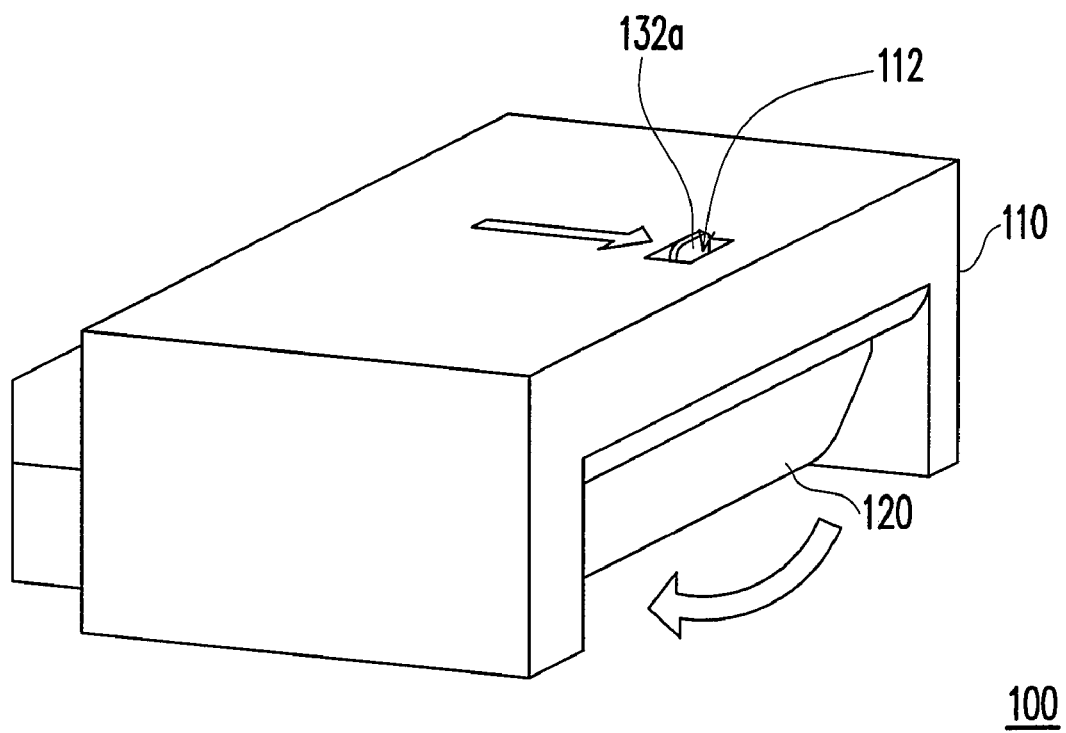

FIGS. 1 and 2 are a schematic cross-sectional diagram and a schematic appearance diagram of the height-adjustable docking station according to an embodiment of the present invention. Referring to FIGS. 1 and 2 together, the height-adjustable docking station 100 of the present invention mainly includes a main frame 110, a hook structure 120, a first elastic member 150, a lever 130, and a second elastic member 140. A connector (not shown) is disposed on the main frame 110. As such, a user can connect the connectors of computer peripheral devices including a mouse, a printer, an external hard disk, a network interface card, or a scanner with the connector on the main frame 110, such that the computer peripheral devices are electrically connected to the docking station 100 constantly. A recess 112 is formed in the main frame 110, and the bottom has an arc surface 110a, such that the hook structure 120 can be disposed on the arc surface 110a.

The hook structure 120 is an asymmetric arched structure and includes a first end 122 and a second end 124 connected to the first end 122. The first end 122 of the hook structure 120 is pivoted on the main frame 110, and the second end 124 has a first positioning groove 124a, a second positioning groove 124b, and a third positioning groove 124c at different horizontal levels, such that the whole docking station 100 can be adjusted to three different horizontal levels according to different requirements of the user. Furthermore, an arc surface 120a is formed between the first end 122 and the second end 124. The arc surface 120a contacts a carrying surface S. Moreover, in this embodiment, three positioning grooves at different horizontal levels are disposed on the second end 124 of the hook structure 120, such that the entire docking station 100 can be adjusted to three different horizontal levels. However, more than three positioning grooves can also be disposed on the second end 124 of the hook structure 120, such that the docking station 100 can be adjusted to more different horizontal levels. Therefore, the number of the positioning grooves is not limited herein.

The first elastic member 150 is pivoted on the first end 122 of the hook structure 120. One end of the first elastic member 150 is fixed on the main frame 110, and the other end is fixed on the hook structure 120, such that the second end 122 of the hook structure 120 is constantly far away from the main frame 110, i.e., moves in a clockwise direction as shown in FIG. 1. The lever 130 has a first rod 132, a second rod 134, and a pivot portion 136 connected between the first and the second rods. The first rod 132 has an adjusting rod 132a exposed by the recess 112 of the main frame 110, and the second rod 134 has a tenon 134a protruding outward to be wedged into the first positioning groove 124a, the second positioning groove 124b, or the third positioning groove 124c of the hook structure 120. The lever 130 is pivoted on the main frame 110 through the pivot portion 136. Further, the second elastic member 140 is pivoted on the pivot portion 136 of the lever 130, in which one end is fixed on the main frame 110, and the other end is fixed on the lever 130, such that the second rod 134 of the lever 130 constantly rests against the second end 122 of the hook structure 120, and the tenon 134a is wedged into one of the positioning grooves.

Figure 3:
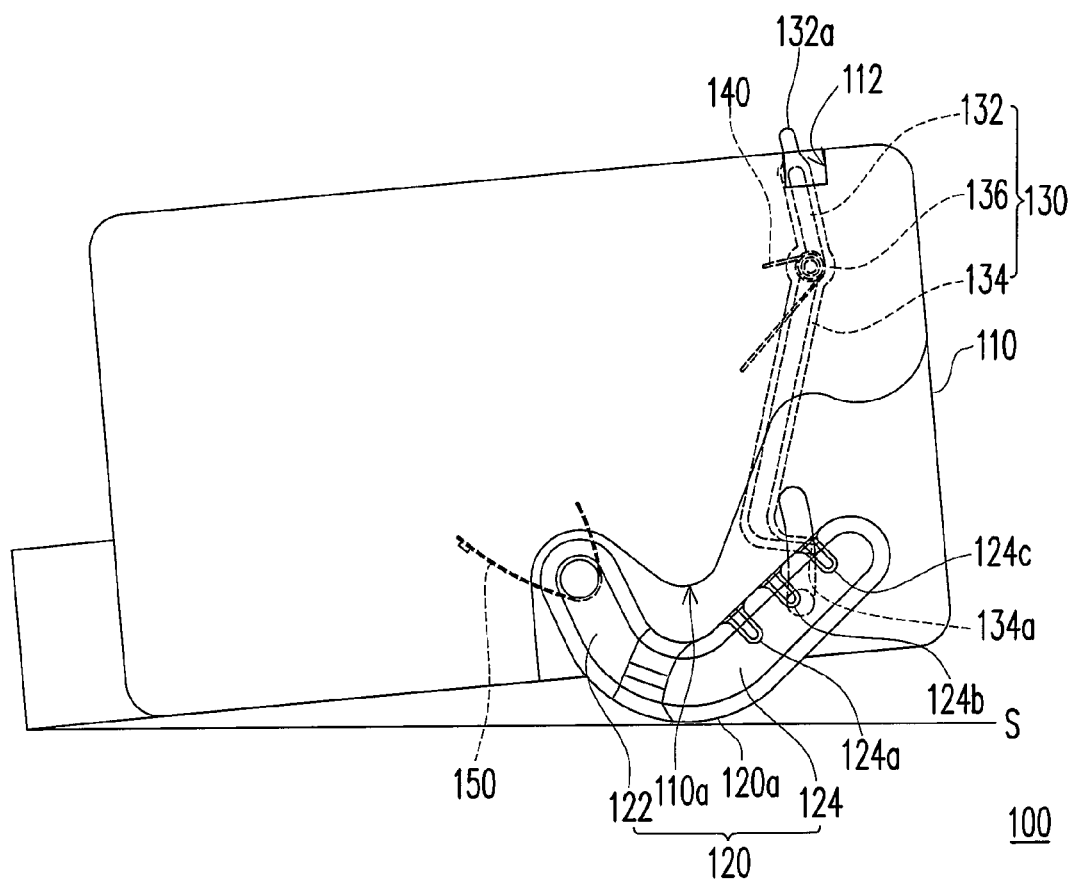
FIG. 3 is a schematic cross-sectional diagram of the height-adjustable docking station in FIG. 1 when the tenon of the lever is wedged into a positioning groove at another position to change the horizontal level.

Referring to FIG. 1, when the tenon 134a is wedged into the first positioning groove 124a, a first horizontal level is formed between the main frame 110 and the carrying surface S. Referring to FIG. 2, when the user adjusts the adjusting rod 132a forward, the lever 130 is rotated in a clockwise direction about the pivot portion 136 as an axle centre, so as to make the tenon 134a come off the first positioning groove 124a. At this time, the hook structure 120 moves in a clockwise direction shown in FIG. 1 about the first end 122 as an axle center, so as to make the tenon 134a to be wedged into the third positioning groove 124c. As shown in FIG. 3, the horizontal level between the main frame 110 and the carrying surface S increases, thereby achieving the purpose of changing the horizontal level of the docking station 100.

If the docking station 100 returns to the horizontal level corresponding to the first positioning groove 124a, it is only required to adjust the adjusting rod 132a again to make the tenon 134a come off the third positioning groove 124c, and then adjust the second end 124 of the hook structure 120 back toward the main frame 110 manually, or press the entire main frame 110 downward to make the tenon 134a to be wedged into the first positioning groove 124a, thereby returning to the original horizontal level. According to the aforementioned operation principles, the user can adjust the adjusting rod 132 by himself/herself to make the tenon 134a being wedged into different positioning grooves, so as to adjust the horizontal level of the docking station 100 according to different requirements.

Furthermore, a damper can be additionally disposed on the first end 122 of the hook structure 120. The arrangement of the damper is to make the hook structure 120 and the lever 130 have different rotational speed, such that the lever 130 may limit the hook structure 120 to the next horizontal level automatically. When the tenon 134a comes off the hook structure, the second end 124 of the hook structure 120 falls slowly to achieve the effect similar to hydraulic pressure.

Figure 4:
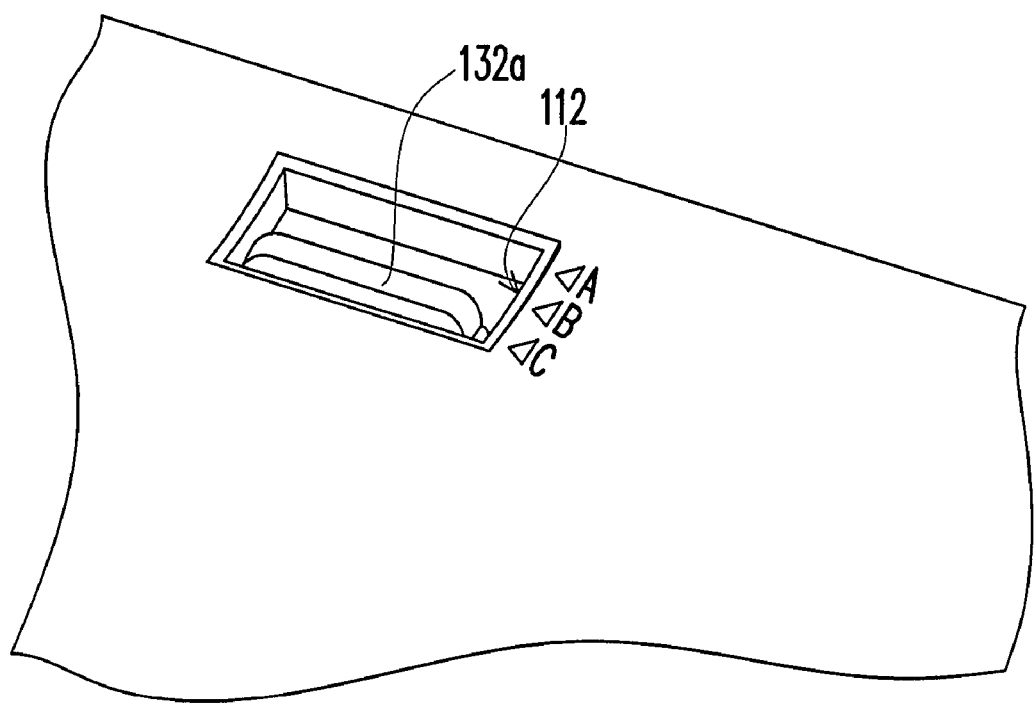
FIG. 4 is a schematic appearance diagram of marking a plurality of adjustment sections corresponding to different horizontal levels marked beside the recess of the main frame.

Moreover, referring to FIG. 4, adjustment sections A, B, and C corresponding to different horizontal levels are marked beside the recess 112 of the main frame 110, such that the user can know the state of the current horizontal level.

In view of the above, the height-adjustable docking station provided by the present invention includes a main frame, a hook structure, and a lever. The hook structure and the lever are pivoted on the main frame. The hook structure has a plurality of positioning grooves at different horizontal levels. One end of the lever has an adjusting rod, and the other end of the lever has a tenon for being wedged into one of the positioning grooves. When the user adjusts the adjusting rod, the tenon comes off the original positioning groove and is wedged into another positioning groove, thus changing the horizontal level of the docking station and then changing a tilt angle between a notebook computer and the desktop, so as to enhance the comfortability when using the notebook computer. Furthermore, as a damper is disposed at a position where the hook structure is pivotally connected to the main frame, when the tenon comes off the hook structure, the hook structure falls slowly to achieve the effect similar to hydraulic pressure.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A height-adjustable docking station, comprising:
   a main frame, having a recess;
   a hook structure, having a first end and a second end connected to the first end, wherein the first end of the hook structure is pivoted on the main frame, the second end has a first positioning groove and at least one second positioning groove, the first positioning groove and the second positioning groove are disposed at different horizontal levels, and an arc surface is formed between the first end and the second end and contacts a carrying surface;
   a first elastic member, pivoted on the first end of the hook structure, wherein one end of the first elastic member is fixed on the main frame, and another end is fixed on the hook structure, such that the second end of the hook structure is constantly far away from the main frame;
   a lever, having a first rod, a second rod, and a pivot portion connected between the first and the second rods, wherein the first rod has an adjusting rod exposed by the recess, the second rod has a tenon protruding outward for being wedged into the first positioning groove or the second positioning groove, and the lever is pivoted on the main frame through the pivot portion; and
   a second elastic member, pivoted on the pivot portion of the lever, wherein one end of the second elastic member is fixed on the main frame, the other end is fixed on the lever, such that the second rod of the lever constantly rests against the second end of the hook structure;
   wherein, when the tenon is wedged into the first positioning groove, a first horizontal level is formed between the main frame and the carrying surface, and when the adjusting rod is adjusted to make the tenon come off the first positioning groove, the second end of the hook structure comes off the main frame to make the tenon being wedged into the second positioning groove, and at this time, a second horizontal level is formed between the main frame and the carrying surface, and the second horizontal level is not equal to the first horizontal level.

2. The height-adjustable docking station as claimed in claim 1, further comprising a damper pivoted on the first end of the hook structure.

3. The height-adjustable docking station as claimed in claim 1, wherein the main frame has an arc surface on which the hook structure is disposed.

4. The height-adjustable docking station as claimed in claim 1, wherein a plurality of adjustment sections corresponding to different horizontal levels is marked beside the recess of the main frame.

5. The height-adjustable docking station as claimed in claim 1, wherein the hook structure is an asymmetric arched structure.

* * * * *